(12) United States Patent
Benzerrouk

(10) Patent No.: US 10,604,422 B2
(45) Date of Patent: Mar. 31, 2020

(54) WATER CONTAINER WITH INTEGRATED PLASMA DISINFECTION

(71) Applicant: Vegapure Water System Inc., Windham, NH (US)

(72) Inventor: Souheil Benzerrouk, Windham, NH (US)

(73) Assignee: VEGAPURE WATER SYSTEM INC., Windham, NH (US)

(*) Notice: Subject to any disclaimer, the term of this patent is extended or adjusted under 35 U.S.C. 154(b) by 0 days.

(21) Appl. No.: 16/190,481

(22) Filed: Nov. 14, 2018

(65) Prior Publication Data

US 2019/0169049 A1 Jun. 6, 2019

Related U.S. Application Data

(60) Provisional application No. 62/585,750, filed on Nov. 14, 2017.

(51) Int. Cl.
| | |
|---|---|
| *C02F 1/30* | (2006.01) |
| *H05H 1/48* | (2006.01) |
| *C02F 1/00* | (2006.01) |
| C02F 101/30 | (2006.01) |
| H02J 7/00 | (2006.01) |
| H02J 7/35 | (2006.01) |

(52) U.S. Cl.
CPC ............... *C02F 1/30* (2013.01); *C02F 1/003* (2013.01); *C02F 1/008* (2013.01); *H05H 1/48* (2013.01); *C02F 2101/30* (2013.01); *C02F 2201/009* (2013.01); *C02F 2303/04* (2013.01); *C02F 2307/02* (2013.01); *H02J 7/0013* (2013.01); *H02J 7/355* (2013.01)

(58) Field of Classification Search
CPC .. C02F 1/30; C02F 1/003; C02F 1/008; C02F 2101/30; C02F 2201/09; C02F 2304/04; C02F 2307/02; H05H 1/48; H02J 7/0013; H02J 7/355
USPC ........................ 250/453.11, 454.11, 455.11
See application file for complete search history.

(56) References Cited

U.S. PATENT DOCUMENTS

| | | | |
|---|---|---|---|
| 2003/0178373 A1* | 9/2003 | Kondo .................. | A01G 31/00 210/748.01 |
| 2012/0175272 A1* | 7/2012 | Kim ....................... | A61M 11/02 205/759 |
| 2015/0064565 A1* | 3/2015 | Todoriki ................ | H01G 11/22 429/231.8 |

* cited by examiner

*Primary Examiner* — Nicole M Ippolito

(57) ABSTRACT

A water container or bottle with integrated disinfection preferably includes a battery compartment, a control printed circuit board (PCB) to manage several parameters including timing, voltage rate, and user-interface. A high voltage power supply is coupled to a set of electrodes to cause an electric discharge. The electric discharge results in a series of reactions in the water that eliminate bacteria and viruses, dissolves organic material, and oxidizes inorganic compounds.

17 Claims, 6 Drawing Sheets

WATER CONTAINER WITH INTEGRATED PLASMA DISINFECTION

CROSS-REFERENCE TO RELATED APPLICATIONS

This application claims priority from U.S. Provisional Patent Application No. 62/585,750 titled "A PORTABLE WATER CONTAINER WITH INTEGRATED PLASMA DISINFECTION", filed on Nov. 14, 2017 and which is incorporated fully herein by reference.

TECHNICAL FIELD

The present invention relates generally to water containers with integrated, non-chemical water disinfection and more particularly, to a water container utilizing a plasma to eliminate bacteria, viruses, organic compounds and emergent contaminants in a water container or vessel.

BACKGROUND INFORMATION

Traditional water disinfection systems utilize ultra-violet light in the germicidal range to inactivate bacteria and eliminate viruses or Ozone gas to oxidize most microorganisms. While largely successful with known pathogens, emergent contaminants may present a challenge where the aforementioned methods fail to sanitize water to an acceptable standard. To address such challenges, newer, highly effective methods are evaluated.

Accordingly, the present invention provides a system, integral with a water container or vessel, which utilizes an electric discharge directly induced in the fluid to cause various reactions to occur including the generation of the highly reactive hydroxyl radical (OH), atomic oxygen, ozone, and even ultra-violet radiation. These reactions are highly effective in the elimination of bacteria, viruses, and many organic and inorganic compounds.

SUMMARY

A water container or bottle with integrated disinfection preferably includes a battery compartment, a control printed circuit board (PCB) to manage several parameters including: timing, voltage rate, and user-interface. The system further includes a high voltage power supply, and a set of electrodes connected directly to the power supply to cause an electric discharge based on Paschen's Law. The electric discharge results in a series of reactions that eliminate bacteria and viruses, dissolves organic material, and oxidizes inorganic compounds. The containers can be utilized by hikers, campers, or in remote areas where access to treated water is difficult or impossible as well as in disaster areas. These water containers or vessels can range from a small portable bottle to a large drum, barrel or other water storage container of almost any size, provided the plasma disinfection unit is appropriately sized and configured to handle the size of the container and the water volume.

Several embodiments have been devised for various applications including: needle type electrodes, plate type electrodes, a combination of needles and a mesh strainer, or needle type electrodes with plate type, or even a metal or metalized container wall either placed as an inside wall in double walled containers or the outside wall in single wall containers.

The present invention features a water container with integrated plasma disinfection comprising a source of high voltage power which is responsive to a control signal, for providing high voltage power to one or more coupled devices. At least first and second electrodes are electrically coupled to the source of high voltage power, and configured for being submerged in the water and energized by the source of high voltage power.

A high voltage power source controller is coupled to the source of high voltage power, and is responsive to an activation signal, for providing the control signal to the source of high voltage power for selectively providing the high voltage power to the at least first and second electrodes under control of the control signal. An activation device is provided which is coupled to the high voltage power source controller, and configured for providing the activation signal to the high voltage power source controller.

In one preferred embodiment, the control signal provided by the high voltage power source controller to the source of high voltage power controls activation and deactivation of the high voltage power source, activation time/duration of the high voltage power source, an amount of voltage provided by the high voltage power source and an amount of electrical current provided by the high voltage power source. The activation device may be a user activatable device such as an on/off button.

The container may be a portable container having a cap, and wherein the source of high voltage power, the high voltage power source controller and the activation device are disposed in the container cap. The at least first and second electrodes include a metal or metalized mesh strainer and a high voltage electrode. The at least first and second electrodes may include first and second electrodes extending from the cap only partially into a depth of the container or extending from the cap to a bottom region of the container.

The high voltage power source controller provides the control signal to the source of high voltage power such that the source of high voltage power creates a potential difference between first and second electrodes that is greater than a threshold voltage, such that:

$$V \geq \sqrt{\frac{kRT_0^2}{\sigma_0 E_a}} \frac{L}{R_0}$$

wherein $E_a$ is the activation energy, $\sigma_0$ is the electric conductivity of the medium, R is the universal gas constant, L is the distance between the electrodes, and $R_0$ is the radius of the breakdown channel, k is thermal conductivity, and $T_0$ is the temperature.

The at least first and second electrodes are typically selected from the group of electrode types consisting of a single needle electrode, a multiple needle electrode, a pin electrode, a probe electrode and a metal or metalized strainer electrode. In one embodiment, the first electrode is a needle type electrode and the second electrode is a metal or metalized strainer electrode. The metal or metalized strainer electrode further performs basic filtering such that disinfected water passes through the metal or metalized strainer electrode to a water container outlet orifice thereby blocking sediments and solids.

The source of high voltage power may comprise one or more batteries configured to deliver a direct current (DC) to a high voltage power converter and a control circuit. The batteries are typically selected from the type of batteries consisting of alkaline and rechargeable batteries. The cap or cover of the container or vessel may further include solar cells integrated into the cover or cap of the water container, and configured to charge the batteries.

The at least first and second electrodes may comprise first and second needle electrodes spaced apart appropriately to guarantee a breakdown at an available voltage. The voltage supplied to the spaced apart first and second needle electrodes may be pulsed to further enhance disinfection efficiency and performance.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

A water container with integrated disinfection system in accordance with the teachings of the present invention uses a plasma arc/energy to eliminate bacteria, viruses and emerging contaminants thereby sanitizing water in the container equipped with the disinfection system of the invention to an acceptable standard or level.

Figure 1:
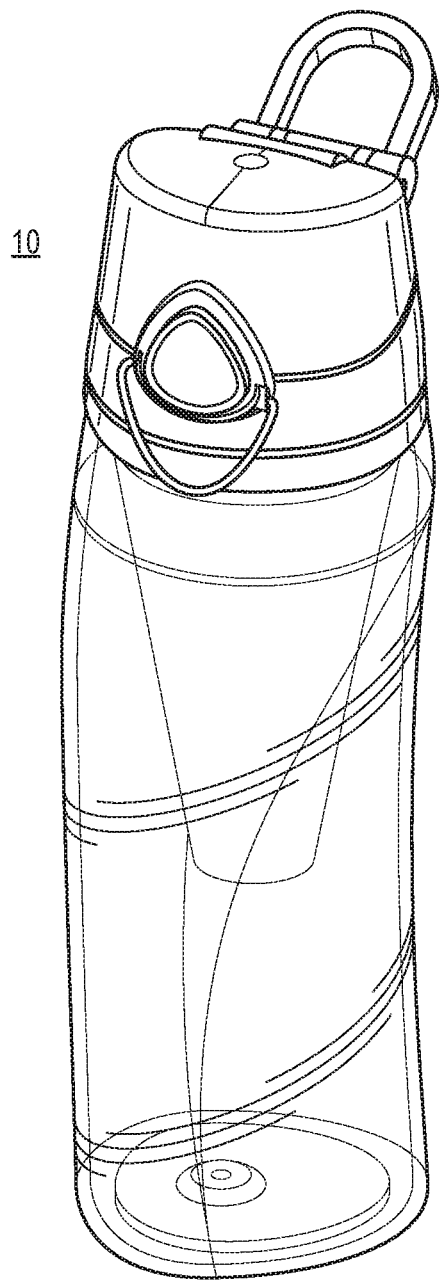
FIG. 1 is a rendering of the preferred embodiment of a portable water container showing components including a cap, a discharge electrode, and a strainer
Figure 2:
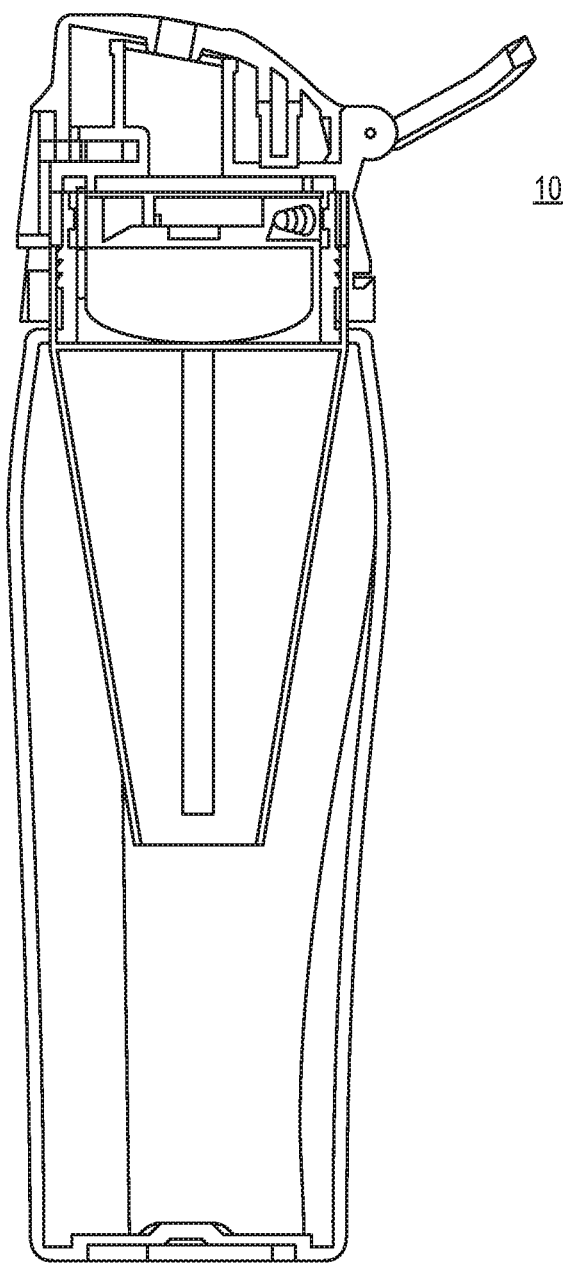
FIG. 2 is a section view of the preferred embodiment of the portable water container of FIG. 1.
Figure 3:
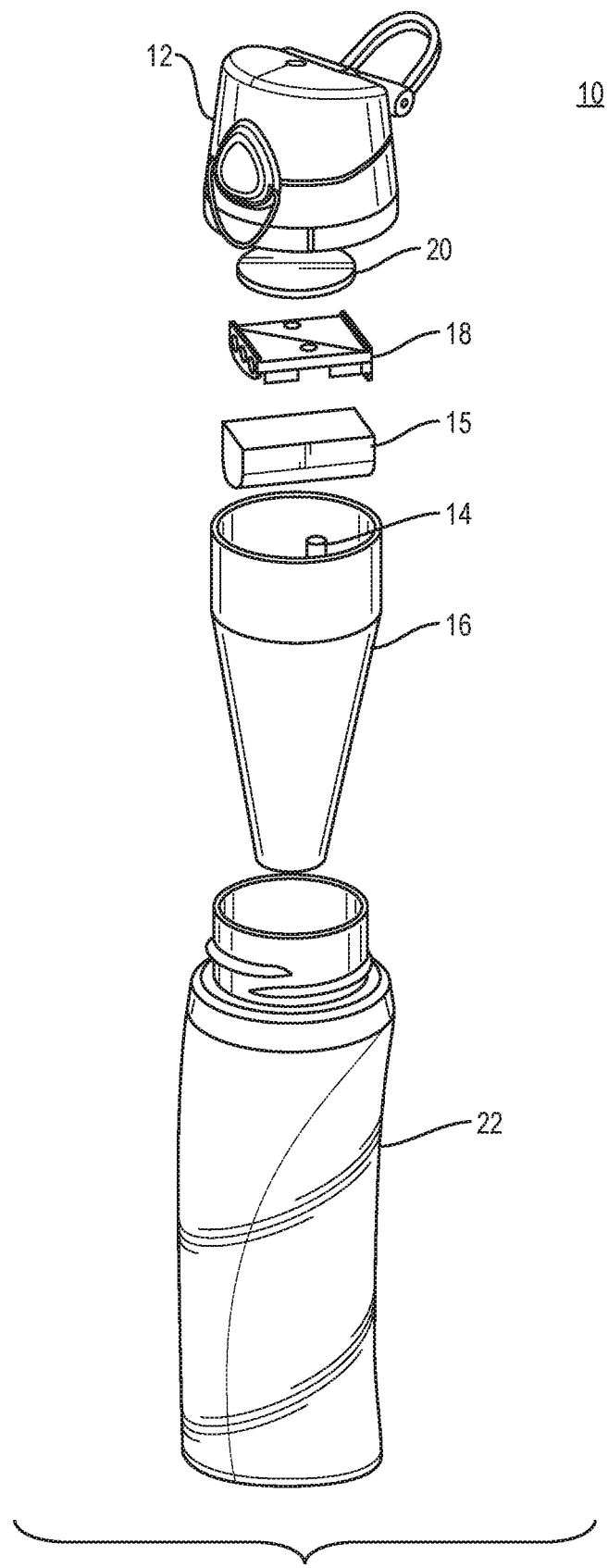
FIG. 3 is an exploded view of the preferred embodiment of the portable water container of FIG. 1.

The disinfection system 10, FIGS. 1-3, in accordance with a first embodiment is comprised of a cover or cap 12, a high voltage electrode 14 coupled to a high voltage power supply 15, a metal or metalized mesh strainer 16, a battery holder 18 and a control PCB 20, all built into the cap or cover 12 of the bottle or container 22. In operation and in order to disinfect water, Aa voltage breakdown is initiated between the high voltage electrode 14 and the metal or metalized strainer 16 once the user presses an ON button (not shown) located on the cap. A charging and control PCB 20 contains all control electronics including a timer to ensure the discharge is active for a sufficient time to effectively disinfect the volume of the fluid in the vessel and in general to control all operation parameters of the disinfection system.

Figure 4:
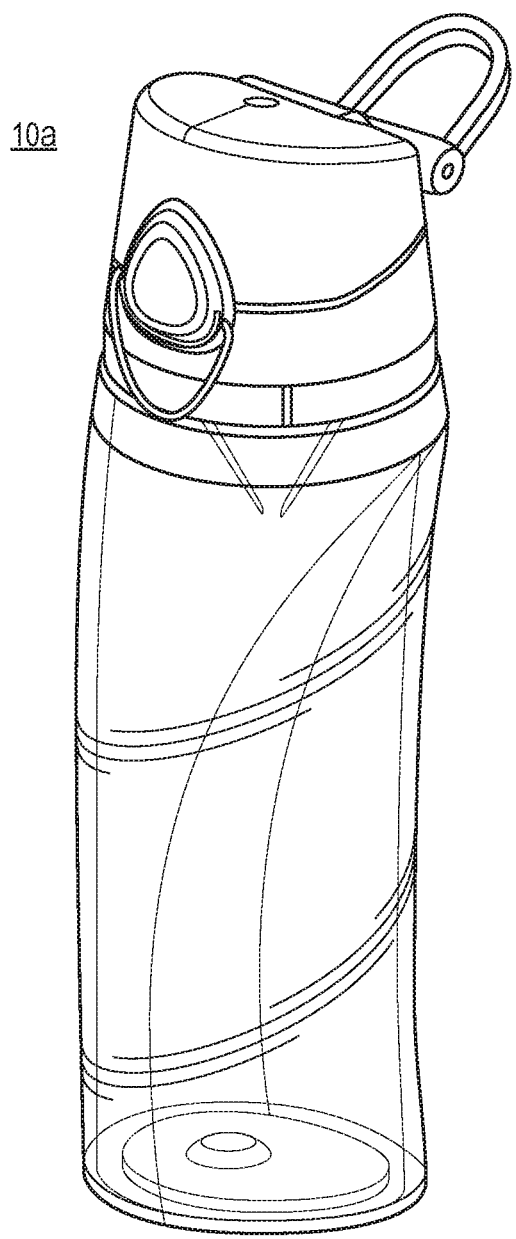
FIG. 4 is perspective interior view showing a second embodiment of a portable water container utilizing needle electrodes.
Figure 5:
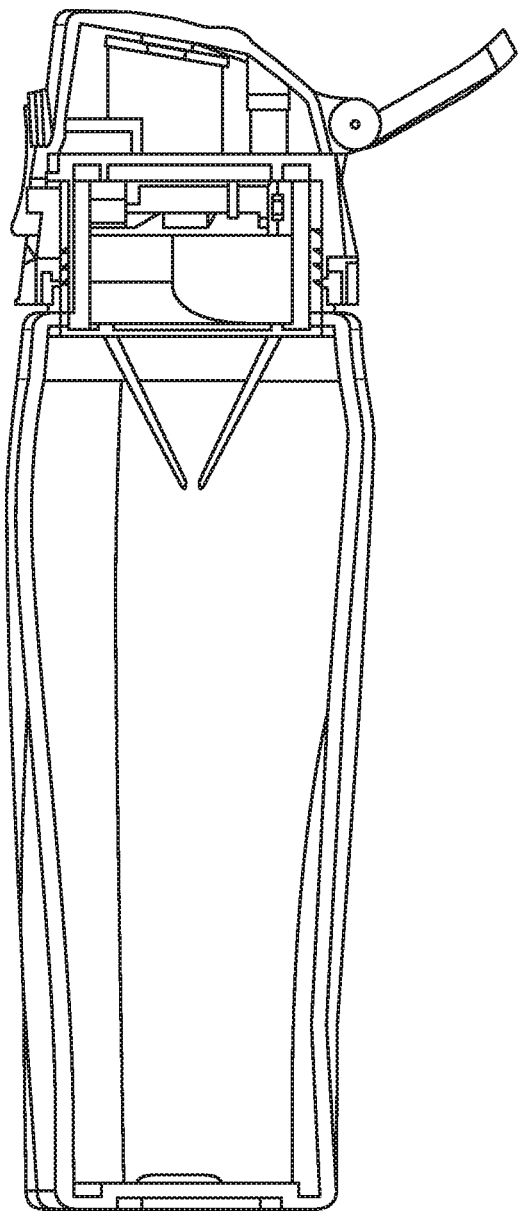
FIG. 5 is a sectional view of the second embodiment of the portable water container utilizing needle electrodes of FIG. 4.
Figure 6:
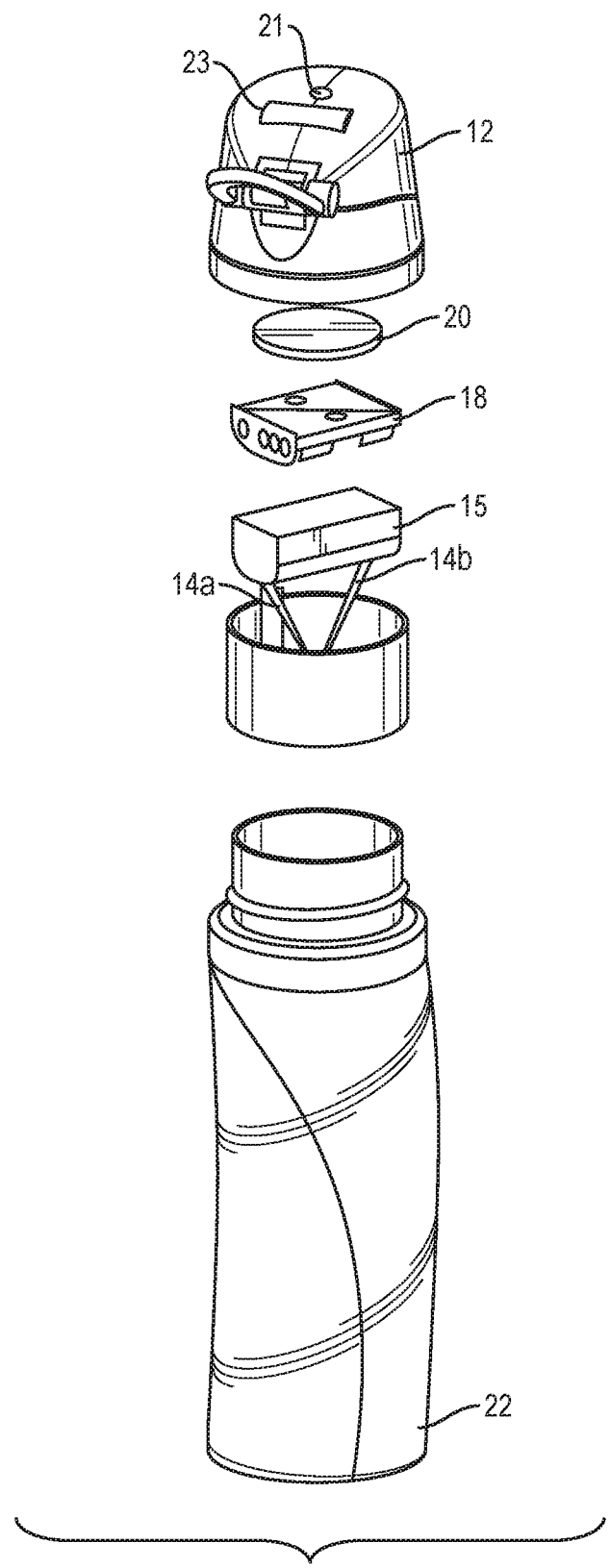
FIG. 6 is an exploded view of the second embodiment showing internal components of the plasma system according to the second embodiment utilizing two needle like electrodes.

The disinfection system 10a, FIGS. 4-6, in accordance with a second embodiment of the invention is comprised of a cover or cap 12, two needle like high voltage electrodes 14a-14b coupled to a high voltage power supply 15, a battery/holder 18 and a control PCB 20, all built into the cap or cover 12 of the bottle or container 22. In operation and in order to disinfect water, a voltage breakdown is initiated between the first high voltage electrode 14a and the second high voltage electrode 14b once the user presses an ON button 21 typically located on the cap 12. A charging and control PCB 20 contains all control electronics including a timer to ensure the discharge is active for a sufficient time to effectively disinfect the volume of the fluid in the vessel and in general to control all operation parameters of the disinfection system. The cap 12 may include a solar cell 23 which serves to charge the battery 18.

Plasma processing in any media is classified based on three categories: remote, indirect, and direct. In remote sources, plasma is initiated and generated away from the treated medium then radicals or species of interest are transported to the target area. Ozone for example, is generated remotely then injected into the water. For indirect processing, plasma is created in a separate medium then the resulting heat, light or atomic species are used to process the water and not the discharge. As an example, in UV based disinfection, a plasma based light source such as a Xenon source can be used to create UV radiation and the resulting light is utilized to deactivate bacteria. Direct plasma is when the discharge is initiated directly in the medium to be processed. This method describes the present invention. Albeit difficult to ignite, a plasma directly in the water provides for the best efficiency and best disinfection performance. A plasma in water will generate the highly reactive OH radical, UV, Ozone, and atomic oxygen. This guarantees that most contaminants are addressed that bacteria are inactivated, organic compounds are dissolved and inorganic materials are oxidized.

To aid in initiating a direct plasma discharge in water, two basic approaches are utilized: the bubble method, or the streamer method. The bubble method involves initiating breakdown in gas bubbles (or cavities) that are injected externally through hollow needle electrodes or other injection methods. Bubbles can also develop in the water due to a thermal process that occurs prior to voltage breakdown. Such bubbles significantly reduce the required breakdown voltage, and indeed it has been demonstrated that the threshold voltage is reduced by at least two orders of magnitude (30 kV/cm when bubbles are present vs. 3 MV/cm in bubble free water). In the preferred embodiment described herein, one electrode is made of a metal or metalized mesh, or a porous strainer. The porosity helps enhance the bubbling effect.

To initiate a discharge, a potential difference between two electrodes must be greater than a threshold voltage, such that:

$$V \geq \sqrt{\frac{kRT_0^2}{\sigma_0 E_a}} \frac{L}{R_0}$$

wherein $E_a$ is the activation energy, $\sigma_0$ is the electric conductivity of the medium, R is the universal gas constant, L is the distance between the electrodes, $R_0$ is the radius of the breakdown channel, k is thermal conductivity, and $T_0$ is the temperature.

The most potent radical for disinfection when a plasma is generated in water is the hydroxyl (OH) radical. OH is stronger than ozone (O3) such that it reacts with most organic and inorganic compounds in rates that approach diffusion controlled limits. Several chemical reactions occur during this process. For example, with organic materials it causes them to lose the hydrogen atom as described by the following reaction:

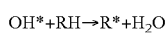

In addition to the chemical reactions, and the inactivation capabilities in the immediate zone of the discharge, shockwaves in the water are created when the plasma is formed. These shockwaves greatly improve the performance by mixing the water, hence allowing the treatment of the whole volume and breaking down some organic materials. To further improve mixing and the utilization of shockwaves, pulsed operation can be performed by driving the electrodes with a pulse train or a burst of electric pulses.

Modifications and substitutions by one of ordinary skill in the art are considered to be within the scope of the present which is not to be limited except by the allowed claims and their legal equivalents.

The invention claimed is:

1. A water container with integrated plasma disinfection, said water container comprising:
    a source of high voltage power, said source of high voltage power responsive to a control signal, for providing high voltage power to one or more coupled devices;
    at least first and second electrodes, electrically coupled to said source of high voltage power, and configured for being submerged in said water and energized by said source of high voltage power;
    a high voltage power source controller, coupled to said source of high voltage power, and responsive to an activation signal, for providing said control signal to said source of high voltage power for selectively providing said high voltage power to said at least first and second electrodes under control of said control signal; and
    an activation device, coupled to said high voltage power source controller, and configured for providing said activation signal to said high voltage power source controller.

2. The water container with integrated plasma disinfection of claim 1, wherein said control signal provided by said high voltage power source controller to said source of high voltage power controls activation and deactivation of said high voltage power source, activation time/duration of said high voltage power source, an amount of voltage provided by said high voltage power source and an amount of electrical current provided by said high voltage power source.

3. The water container with integrated plasma disinfection of claim 1, wherein said activation device is a user activatable device.

4. The water container with integrated plasma disinfection of claim 3, wherein said user activatable device is a user activatable on/off button.

5. The water container with integrated plasma disinfection of claim 4, wherein said container is a portable container having a cap, and wherein said source of high voltage power, said high voltage power source controller and said activation device are disposed in said container cap.

6. The water container with integrated plasma disinfection of claim 1, wherein said at least first and second electrodes include a metal or metalized mesh strainer and a high voltage electrode.

7. The water container with integrated plasma disinfection of claim 1, wherein said at least first and second electrodes include first and second electrodes extending from said cap only partially into a depth of said container.

8. The water container with integrated plasma disinfection of claim 1, wherein said at least first and second electrodes include first and second electrodes extending from said cap to a bottom region of said container.

9. The water container with integrated plasma disinfection of claim 1, wherein said high voltage power source controller provides said control signal to said source of high voltage power such that said source of high voltage power creates a potential difference between first and second electrodes that is greater than a threshold voltage, such that:

$$V \geq \sqrt{\frac{kRT_0^2}{\sigma_0 E_a}} \frac{L}{R_0}$$

wherein $E_\alpha$ is the activation energy, $\sigma_0$ is the electric conductivity of the medium, R is the universal gas constant, L is the distance between the electrodes, and $R_0$ is the radius of the breakdown channel, k is thermal conductivity, and $T_0$ is the temperature.

10. The water container with integrated plasma disinfection of claim 1 wherein the at least first and second electrodes are selected from the group of electrode types consisting of a single needle electrode, a multiple needle electrode, a pin electrode, a probe electrode and a metal or metalized strainer electrode.

11. The water container with integrated plasma disinfection of claim 1, wherein a first electrode is a needle type electrode and the second electrode is a metal or metalized strainer electrode.

12. The water container with integrated plasma disinfection of claim 11 wherein the metal or metalized strainer electrode further performs basic filtering such that disinfected water passes through the metal or metalized strainer electrode to a water container outlet orifice thereby blocking sediments and solids.

13. The water container with integrated plasma disinfection of claim 1, wherein the source of high voltage power comprises one or more batteries configured to deliver a direct current (DC) to a high voltage power converter and a control circuit.

14. The water container with integrated plasma disinfection of claim 13, wherein the batteries are selected from the type of batteries consisting of alkaline and rechargeable batteries.

15. The water container with integrated plasma disinfection of claim 14, further including solar cells integrated into a cover or cap of a water container, said solar cells configured to charge the batteries.

16. The water container with integrated plasma disinfection of claim 1, wherein the at least first and second electrodes comprise first and second needle electrodes spaced apart appropriately to guarantee a breakdown at an available voltage.

17. The water container with integrated plasma disinfection of claim 1, wherein the voltage is pulsed to further enhance disinfection efficiency and performance.

* * * * *